United States Patent [19]

Pfennings

[11] Patent Number: 4,978,867

[45] Date of Patent: Dec. 18, 1990

[54] INTEGRATED CIRCUIT WITH ON-CHIP VOLTAGE CONVERTER

[75] Inventor: Leonardus C. M. G. Pfennings, Eindhoven, Netherlands

[73] Assignee: U.S. Philips Corp., New York, N.Y.

[21] Appl. No.: 445,896

[22] Filed: Dec. 1, 1989

Related U.S. Application Data

[63] Continuation of Ser. No. 171,994, Mar. 23, 1988, abandoned.

[30] Foreign Application Priority Data

Jun. 24, 1987 [NL] Netherlands .......................... 8701472

[51] Int. Cl.⁵ ...................... H03K 3/01; H03K 17/56; G05F 1/40
[52] U.S. Cl. ................................. 307/296.6; 307/475; 307/246; 323/282
[58] Field of Search ............... 307/296.3, 296.4, 296.5, 307/296.6, 296.8, 270, 572, 475, 246, 264; 323/282–284, 288, 317

[56] References Cited

U.S. PATENT DOCUMENTS

| | | | |
|---|---|---|---|
| 3,660,753 | 5/1972 | Judd et al. ........................... | 323/283 |
| 3,908,136 | 9/1975 | Desperques-Volmier .......... | 307/304 |
| 4,097,773 | 6/1978 | Lindmark ......................... | 307/296.3 |
| 4,260,946 | 4/1981 | Wheatley, Jr. ...................... | 307/297 |
| 4,420,700 | 12/1983 | Fay et al. ........................... | 307/296.6 |
| 4,471,290 | 9/1984 | Yamaguchi ....................... | 307/296.6 |
| 4,479,052 | 10/1984 | Suzuki ................................ | 307/297 |
| 4,683,382 | 7/1987 | Sakurai et al. .................. | 307/296 R |

FOREIGN PATENT DOCUMENTS 0147456  11/1979  Japan .............................. 307/296.4

OTHER PUBLICATIONS

Holt, "Electronic Circuits", J. Wiley & Sons, New York, 1978, pp. 90–92.

Primary Examiner—Timothy P. Callahan
Attorney, Agent, or Firm—Steven R. Biren

[57] ABSTRACT

An integrated circuit has an on-chip supply voltage reducer, and includes a voltage converter for periodically charging the integrated circuit capacitance. The voltage converter may include a power switching transistor which is connected between an external supply terminal and an internal supply terminal and which is controled by a detector amplifier which senses the voltage across the integrated circuit capacitance connected to the internal supply terminal and which turns the switching transistor on and off depending on the value sensed, with a given hysteresis.

2 Claims, 3 Drawing Sheets

INTEGRATED CIRCUIT WITH ON-CHIP VOLTAGE CONVERTER

This is a continuation of application Ser. No. 171,994, filed Mar. 23, 1988, now abandoned.

BACKGROUND OF THE INVENTION

The invention relates to an integrated circuit, having an external and an internal supply terminal and a voltage converter which is connected between said terminals in order to apply a voltage to the internal supply terminal which is lower than that present on the external supply terminal.

An integrated circuit of the kind set forth is known from 1987 IEEE International Solid-State Circuits Conference, Feb. 27, 1987, SESSION XIX: HIGH DENSITY SRAMs, FAM 19.2: A256K SRAM with On-Chip Power Supply Conversion, Alan L. Roberts et al., pp. 252-253.

The integrated circuit known from the cited publication comprises not only said voltage converter but also a detector which detects whether a standard supply voltage of 5.0 V is present on the external supply terminal or a lower supply voltage, in this case 3.3 V. The know integrated circuit also comprises a switching circuit with two electronic switches which are controlled by the detector. A first electronic switch can directly connect the external and the internal supply terminal, while the second electronic switch can connect the voltage converter to the external and the internal supply terminal. When the detector detects an external supply voltage of 3.3 V, the detector turns on the first electronic switch and turns off the second electronic switch. When the detector detects a standard supply voltage of 5 V, the reverse takes place, i.e. the first electronic switch is turned off and the second electronic switch is turned on. Thus, when a standard supply voltage of 5 V is applied to the external supply terminal, the detector and the switching circuit of the known integrated circuit may be assumed to be absent and the input of the voltage converter may be assumed to be connected to the external supply terminal.

The voltage converter of the known integrated circuit comprises an active voltage divider, with an analog circuit which has the drawback that oscillations could occur therein.

SUMMARY OF THE INVENTION

It is the object of the invention at least to mitigate the described drawback; to achieve this, an integrated circuit of the kind set forth in accordance with the invention is characterized in that the voltage converter comprises means for periodically charging the integrated circuit capacitance connected to the internal supply terminal to a given voltage.

Contrary to the conversion in the known integrated circuit, the conversion in the present circuit is not continuous but periodical.

In essence the invention is based on the recognition of the fact that the integrated circuit capacitance can be used as a power supply source for the integrated circuit of which it forms part.

It is to be noted that the use of the integrated circuit capacitance itself is known from the cited publication. However, in the known integrated circuit the integrated circuit capacitance is used as a decoupling capacitance, while in accordance with the present invention the integrated circuit capacitance is used as a supply source for supplying a voltage which is lower than the standard voltage for at least a given type of integrated circuit.

BRIEF DESCRIPTION OF THE DRAWING

Embodiments in accordance with the invention will be described in detail hereinafter with reference to the drawing, in which.

Figure 1:
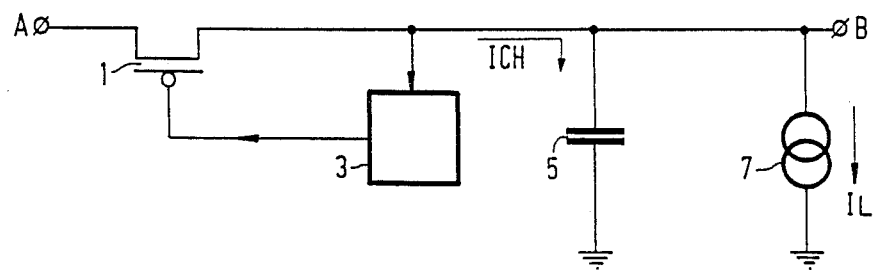
FIG. 1 shows a simplified combined circuit diagram and equivalent diagram of an integrated circuit in accordance with the invention.

The description of the invention with reference to the drawing will be preceeded by a description of the background.

DESCRIPTION OF THE PREFERRED EMBODIMENTS

For reasons of reliability, a drain-source voltage which is lower than the standard supply voltage of 5 V must be used for MOS components having channel lengths of, for example, less than 1 $\mu$m. Notably in 256K or larger static random access memories, utilizing memory cells which have a channel length of as little as 0.7 $\mu$m and which consist of 6 CMOS transistors arranged in a memory matrix, the need for an on-chip supply voltage reducer becomes apparent, notably for the memory matrix. In this environment no other circuit solutions, for example cascade connection of transistors, can be used because such solutions would increase the cell surface area.

The proposed on-chip voltage reducing facility is based on the parasitic integrated circuit capacitance in the memory matrix, between the memory matrix supply terminals, ground and the substrate, the bit lines and ground, the internal memory cell terminals, ground and power supply, and the capacitance between the well region and the substrate.

The circuit diagram of a feasible embodiment of what will be referred to hereinafter as the voltage converter of the invention is shown in FIG. 1, in combination with the equivalent diagram of the integrated circuit in as far as the integrated circuit capacitance is concerned.

The reference A in FIG. 1 denotes the external supply terminal and the reference B denotes the internal supply terminal. Between the external supply terminal A and the internal supply terminal B there is connected an electronic switch, in this case a PMOS power switching transistor 1, a detector, notably a detector amplifier 3, being connected by way of the detection input to the internal supply terminal B, its output being connected to the control input of the electronic switch, the gate electrode of the transistor 1 in the embodiment shown. The reference numeral 5 denotes the integrated circuit capacitance which may have a value of, for example 3 nF in the case of a 256K SRAM. Finally, the reference numeral 7 denotes a current source which supplies a load currence IL when the integrated circuit is active. It is to be noted that this also represents the discharge current of the capacitance 5. A charge current ICH for the capacitance 5 is supplied by the transistor 1.

Figure 2:
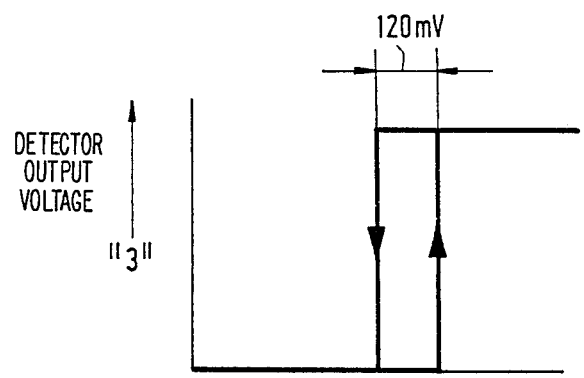
FIG. 2 shows a graph illustrating the hysteresis of the detector shown in FIG. 1.

The transmission characteristic of the detector 3 is shown in FIG. 2. In FIG. 2, the horizontal axis represents the detector input voltage at point B, and the vertical axis represents the detector amplifier 3 output and is according labelled "3". In this case, whereto the invention is not restricted, the detector has a hysteresis of approximately 120 mV. The charge stored in the capacitance 5 amounts to 3 nC per V for said capacitance value of 3 nF, or 3 pC/mV. A load or discharge current (IL) of, for example 10 mA discharges the capacitance 5 with 10 pC/ns. In these circumstances the voltage at the terminal B decreases by approximately 3.3 mV/ns. The discharge time for a voltage decrease of 120 mV on the terminal B then amounts to 36 ns. This voltage decrease at the terminal B, corresponding to the hysteresis of detector 3, is the maximum permissible decrease, so that after expiration of said 36 ns the detector 3 will turn on the transistor 1 in order to charge the capacitance 5 again. If the charge current ICH supplied by the transistor 1 is four times larger than the discharge current which is equal to the current IL supplied by the current source 7, the period of time required for charging will amount to one third of the discharge time, i.e. 12 ns. The cycle time of the detector thus amounts to 48 ns.

Figure 3:
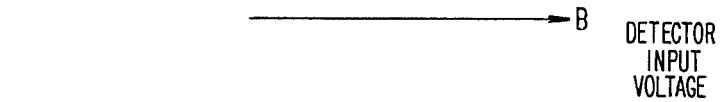
FIG. 3 shows a graph illustrating the variation in time of the internal supply voltage and the output signal of the detector in the circuit shown in FIG. 1.
Figure 3:
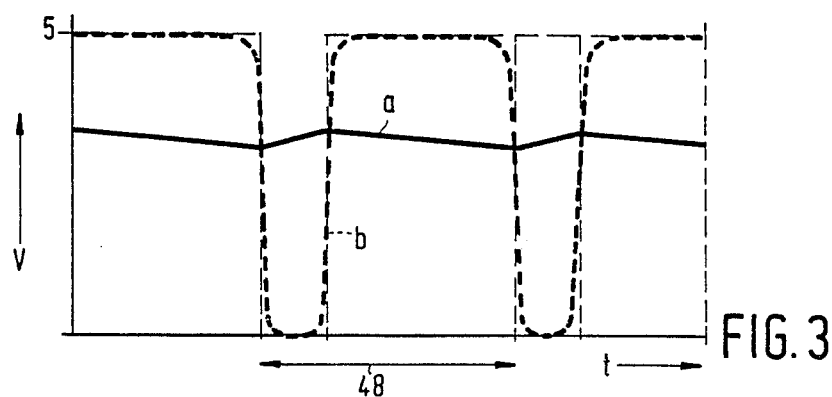

In FIG. 3 the relation in time between the voltages on the terminal B and on the output of the detector 3 is denoted by the curves a and b, respectively.

Figure 4:
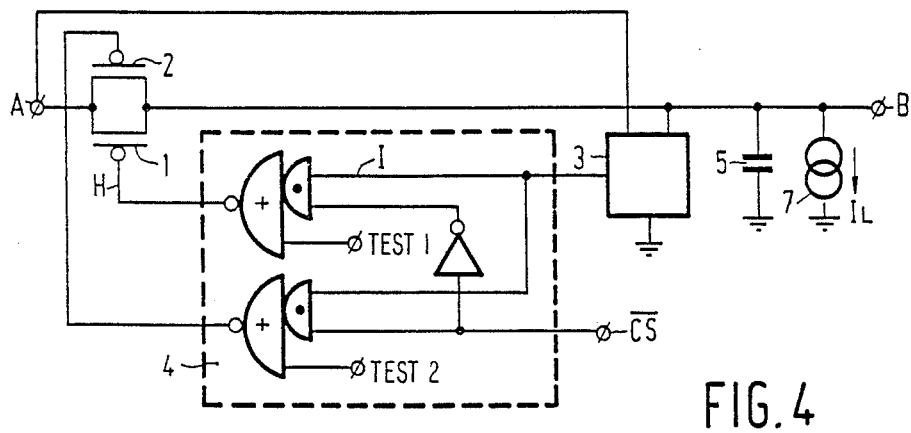
FIG. 4 shows a diagram which corresponds to that shown in FIG. 1 but which also comprises a second electronic switch and a logic circuit which responds to an integrated circuit selection signal.

The embodiment of a voltage converter in accordance with the invention which is shown in FIG. 4 corresponds to that of FIG. 1, so that the same reference symbols are used for denoting corresponding parts; however, the embodiment shown in FIG. 4 comprises a number of additional features which will be useful in practice. For example, a second transistor 2 is connected in parallel with transistor 1, the second transistor being proportioned for smaller currents in comparison with the first transistor, there also being provided a logic circuit 4, the smaller transistor 2 and the logic circuit 4 being intended to enable the use of the transistor 2 instead of the transistor 1 when the integrated circuit has been deselected, so that the peak currents can be decreased. To this end, a first input of the logic circuit 4 is connected to the output of the detector 3, another input of the logic circuit 4 receiving the circuit deselection signal $\overline{CS}$. Depending on the logic state of the signal $\overline{CS}$, the output signal of the detector 3 will be conducted either to the gate electrode of the transistor 1 or to the gate electrode of the transistor 2. The logic circuit 4 also comprises two test inputs TEST1, TEST2 for grounding the gate electrode of the transistors 1, 2 so that the voltage on the terminal B becomes equal to that on the terminal A. The detector 3 is then switched off. FIG. 4 notably shows that the output signal of the detector 3 controls the power transistor 1 via an inverting logic gate (series connection of an AND-gate and a NOR-gate) of the logic circuit 4. The transistor 2 of FIG. 4, being controlled by a further inverting logic gate having the same construction in the logic circuit 4, can be activated, when the integrated circuit has been selected, in order to reduce charge current peaks, as has already been stated. It is also to be noted that the output signal of the detector 3 of FIG. 4 is the inverted signal of the output of the detector 3 of FIG. 1.

Figure 5:
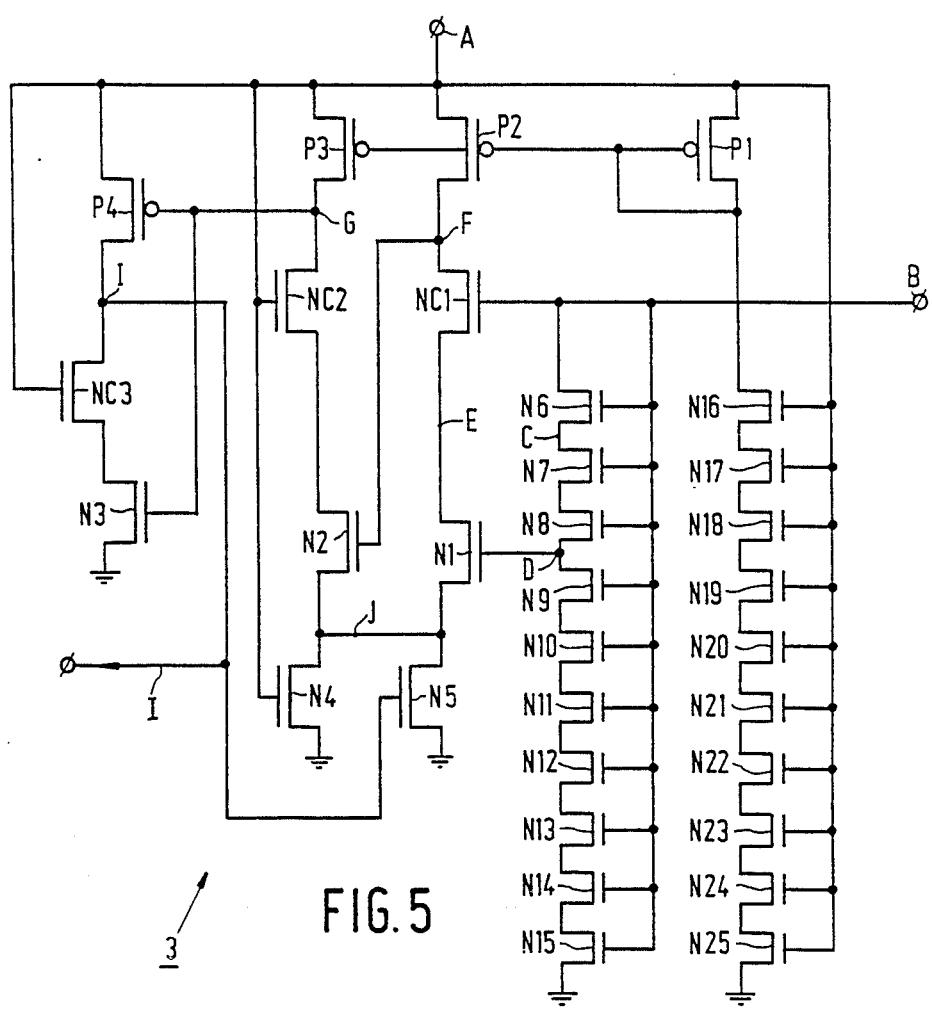
FIG. 5 shows a circuit diagram illustrating an implementation of the detector shown in FIG. 4.

The detector, notably a detector amplifier 3 (of FIG. 4), consists of three sections as shown in FIG. 5: a current mirror circuit composed of the NMOS transistors N16 to N25 and the PMOS transistors P1 to P3, a detection circuit comprising the NMOS transistors N6 to N15, NC1, NC2, N1, N4 and N5 and the PMOS transistors P2 and P3, and an inverting amplifier stage comprising the NMOS transistors N3 and NC3 and the PMOS transistor P4.

The transistors NC1, NC2 and NC3 protect the transistors N1, N2 and N3 against excessive drain-source voltages (hot electrons). Moreover, the transistor NC1 assists in keeping the voltage swing at the junction E of the transistors N1 and NC1 small in that the gate electrode of the transistor NC1 is connected to the internal supply terminal B. The terminal B of FIG. 5 constitutes the input of the detector 3 while the terminal I constitutes its output.

It is to be noted that the circuit shown in FIG. 5 represents one of the many possibilities. In the present case, the internal supply voltage at the terminal B equals twice the threshold voltage of the transistors plus the voltage swing, but could also be based on an internal supply voltage amounting to, for example three times the threshold voltage of the transistors plus the voltage swing; this depends, of course, on the desired internal supply voltage and the threshold voltage of the NMOS transistors.

Figure 6:
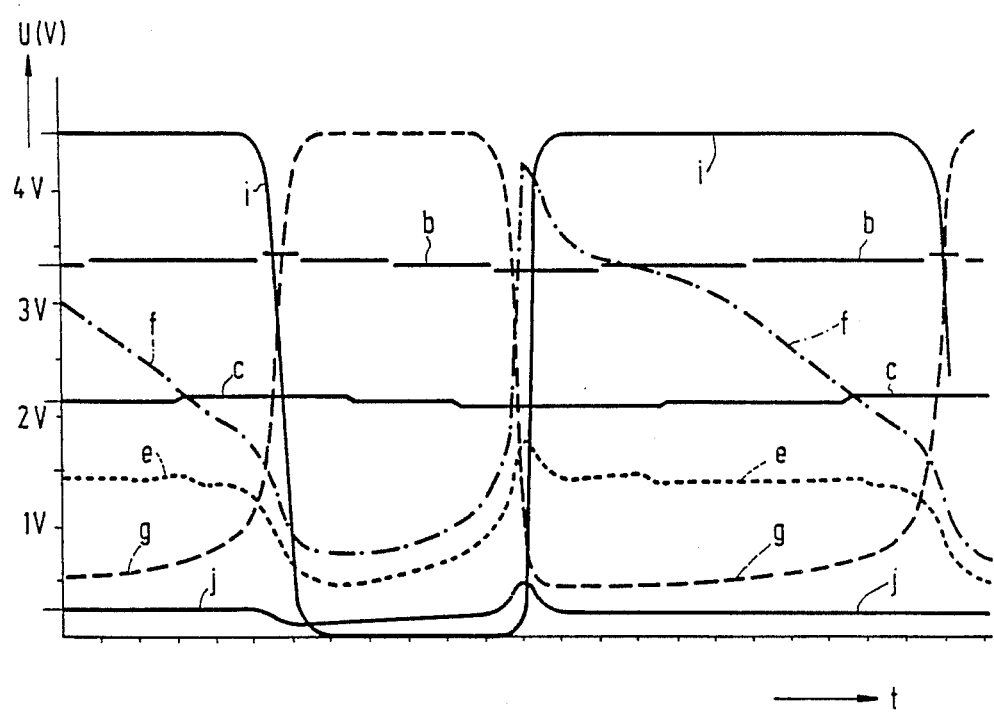
FIG. 6 shows a waveform diagram illustrating the variation in time of the signals occurring at the terminals in the detector circuit shown in FIG. 5.

The operation of the detector amplifier 3 of FIG. 5 will be described with reference to FIG. 6. FIG. 6 shows the variation in time t of the voltages (curves b, c, e, f, g, i and j) on the terminals B, C, E, F, G, I and J in the detector 3 of FIG. 5 for an external supply voltage of 4.5 V, a charge current of 16 mA, a discharge current (IL) of 10 mA, and a temperature of 100° C.

On the terminal C the transistor N6 causes a threshold voltage shift VTN with respect to the terminal B. The transistors N7 to N15 form a voltage divider. (Instead, a threshold voltage shift could also be used).

The terminal D is connected to the gate electrode of the transistor N1. The gate electrode of the transistor N4 is connected to the external supply voltage by connection to the external supply terminal A. The transistor N4 provides the hysteresis while the transistor N5 provides a given compensation in order to reduce the hysteresis.

FIG. 6 commences at the instant at which the internal voltage b on the internal supply terminal B increases. The voltage i on the terminal I is then high. The transistor 1 of FIG. 4 is then active, which means that the integrated circuit capacitance is charged, notably recharged. When the voltage i on the terminal I is high, 4.5 V in the case shown, the voltage g on the terminal G will be low, 0.5 V in the present case, and will slowly increase due to a decreasing voltage f on the terminal F. This is caused by a very small increase of the voltage on the terminal D. In this respect it is to be noted that a variation of 120 mV of the voltage b on the internal supply terminal B is permitted in the present case. The voltage on the terminal D is subject to a loss so that a total variation of approximately 80 mV remains. The voltage e on the terminal E hardly changes during the major part of the cycle, because the voltage due to the transistor NC1 with the threshold voltage plus drive is lower than the voltage b on the internal supply terminal B. In these circumstances current will flow from the branch of the terminal G as well as from the branch of the terminal F, via the terminal J, through the transistors N4 and N5 to ground.

During the switching of the terminals F and G, the total current through the two branches at the terminal J decreases, so that the voltage j on the terminal J decreases while the voltage on the terminal D increases, thus causing an accelerated decrease of the voltage f on the terminal F and hence also of the voltage e on the terminal E, with the result that the voltage g on the terminal G increases very rapidly so that the voltage i on the terminal I, that is to say the output of the detector 3, very quickly changes over from 4.5 V to 0 V. The transistor 4 is then turned off, so that the voltage j on the terminal J slightly increases again. If this were not the case, the voltage j on the terminal J would remain low, thus causing to great a hysteresis. The voltage i on the terminal I then amounts to 0 V, so that 4.5 V (h in FIG. 6) will be present on the gate electrode of the transistor 1 in FIG. 4, with the result that this transistor is turned off.

As a result of the uninterrupted discharge current IL (current source 7 in FIG. 1 and 4) of in this case 10 mA, the voltage b on the terminal B decreases and hence also the voltage on the terminal D. As a result, the voltage e, f on the terminals E, F start to increase again, after which the next switching point will occur, where all terminals are switched in the opposite direction again. During switching over, overshoot of the hysteresis occurs, thus preventing oscillation during switching.

What is claimed is:

1. An integrated circuit comprising an external and an internal supply terminal and a voltage converter which is connected between said terminals in order to apply a voltage to the internal supply terminal which is lower than that present on the external supply terminal, and a parasitic integrated circuit capacitance present at said internal supply terminal, characterized in that the voltage converter comprises means for repeatedly charging the parasitic integrated circuit capacitance to a desired voltage, said means comprising a first electronic switch having a control input and which is connected between said terminals and also comprises a detector, an input of said detector being connected to the internal supply terminal and an ouput of said detector being coupled to the control input of the electronic switch in order to set the state of the switch depending on the voltage on the internal supply terminal, a second electronic switch being arranged in parallel with said first electronic switch, which second switch is proportioned for smaller currents, the integrated circuit comprising a logic circuit, a first input of which is connected to the output of the detector and a second input of which receives an integrated circuit selection signal during operation, a first and a second output thereof being connected to the control input of the first and the second electronic switch, respectively, in order to conduct the output signal of the detector to one of the first and the second output of the logic circuit, depending on the logic state of the integrated circuit selection signal.

2. An integrated circuit as claimed in claim 1, characterized in that the detector has a transfer characteristic exhibiting hysteresis.

* * * * *